United States Patent
Cheng et al.

(10) Patent No.: US 10,411,578 B2
(45) Date of Patent: Sep. 10, 2019

(54) LOW ELECTRIC FAN-TYPE POWER GENERATING DEVICE WITH LOW ENERGY CONSUMPTION

(71) Applicants: Chun-Ying Cheng, Taoyuan (TW); Jung-Chieh Cheng, Taoyuan (TW)

(72) Inventors: Chun-Ying Cheng, Taoyuan (TW); Jung-Chieh Cheng, Taoyuan (TW)

(*) Notice: Subject to any disclaimer, the term of this patent is extended or adjusted under 35 U.S.C. 154(b) by 280 days.

(21) Appl. No.: 15/606,008

(22) Filed: May 26, 2017

(65) Prior Publication Data

US 2018/0342940 A1    Nov. 29, 2018

(51) Int. Cl.

| | |
|---|---|
| *H02K 47/14* | (2006.01) |
| *F04D 19/00* | (2006.01) |
| *F04D 25/06* | (2006.01) |
| *H02K 53/00* | (2006.01) |
| *F04D 25/16* | (2006.01) |
| *F04D 25/02* | (2006.01) |

(52) U.S. Cl.
CPC ........... *H02K 47/14* (2013.01); *F04D 19/002* (2013.01); *F04D 19/007* (2013.01); *F04D 25/024* (2013.01); *F04D 25/0673* (2013.01); *F04D 25/166* (2013.01); *H02K 53/00* (2013.01); *Y10S 74/09* (2013.01)

(58) Field of Classification Search
CPC .... F04D 19/002; F04D 19/007; F04D 25/024; F04D 25/0673; F04D 25/166; H02K 47/04; H02K 47/14; H02K 47/20
See application file for complete search history.

(56) References Cited

U.S. PATENT DOCUMENTS

| | | | |
|---|---|---|---|
| 7,208,846 B2* | 4/2007 | Liang | F03D 9/00 290/1 R |
| 2005/0074324 A1* | 4/2005 | Yoo | F03D 1/04 415/4.3 |
| 2007/0147986 A1* | 6/2007 | Wu | F04D 25/166 415/122.1 |
| 2016/0097394 A1* | 4/2016 | Golm, Jr. | F04D 19/007 417/423.1 |
| 2017/0342990 A1* | 11/2017 | Martens | F03G 7/10 |

* cited by examiner

*Primary Examiner* — Ramon M Barrera
(74) *Attorney, Agent, or Firm* — Alan D. Kamrath; Mayer & Williams PC (57) ABSTRACT

An electric fan-type power generating device includes a housing receiving an electric motor that is supplied electricity from a chargeable battery to drive a first fan and a second fan to rotate at high speeds to thereby generate wind power close to a third fan mounted to a first generator. The first fan uses the wind power to drive the third fan in the housing. The third fan drives the first generator to generate electricity that is supplied to the chargeable battery. The second fan uses the wind power in the housing to drive a fourth fan to rotate. The fourth fan drives the second generator to generate electricity that is supplied to the chargeable battery. The chargeable battery recycles the electricity that supports operation of the electric motor for generating wind power. Furthermore, the wind power drives the first and second generators to continue generating electricity.

10 Claims, 8 Drawing Sheets

LOW ELECTRIC FAN-TYPE POWER GENERATING DEVICE WITH LOW ENERGY CONSUMPTION

BACKGROUND OF THE INVENTION

The present invention relates to a power generating device and, more particularly, to an electric fan-type power generating device with low energy consumption.

Various fans use main power as the power source for driving a motor to rotate fan blades. The air behind the fan blades is driven forward to generate wind power making air flow.

However, these fans using motors must be powered by the main power and, thus, cannot be used anytime and anywhere. Furthermore, the mechanical energy generated by the motor is not recycled and reused. Namely, the mechanical energy is direct power loss. The cumulative loss of energy is considerable. Thus, it is an important issue to persons in this field.

BRIEF SUMMARY OF THE INVENTION

The primary objective of the present invention is to provide an electric fan-type power generating device with low energy consumption using an electric fan to drive a first fan and a second fan to rotate at high speeds to thereby generate wind power close to a third fan. The first fan uses the wind power to drive the third fan in the housing. The third fan drives a first generator to generate electricity that is supplied to a chargeable battery. At the same time, the second fan uses the wind power in the housing to drive a fourth fan to rotate. The fourth fan drives a second generator to generate electricity that is supplied to the chargeable battery. The chargeable battery recycles the electricity that supports operation of the electric motor for generating wind power. Furthermore, the wind power drives the first generator and the second generator to continue generating electricity. Accordingly, the present invention can be directly used anytime and anywhere while prolonging the service time of the chargeable battery.

Another objective of the present invention is to increase the windage area and the starting speed by providing the diameter of the third fan on the second generator to be larger than the diameter of the first fan on the electric motor and by providing the diameter of the fourth fan on the second generator to be larger than the diameter of the second fan of the electric motor.

A further objective of the present invention is to provide a power device and a chargeable battery to output electricity to an external electric appliance according to need.

An electric fan-type power generating device with low energy consumption according to the present invention includes a housing having a first sidewall, a second sidewall opposite to the first sidewall, and a peripheral wall interconnected between the first sidewall and the second sidewall. The housing includes a plurality of vents. An electric motor is mounted in the housing. The electric motor includes a first stator and a first rotor concentric to the first stator. A first shaft extends through a central portion of the first rotor and is coupled to the first rotor. The first shaft includes a first end facing the first sidewall and a second end facing the second sidewall. A first fan and a second fan are mounted opposite to the first fan. The first fan and the second fan are driven by the first shaft of the electric motor. The second fan is located between the first fan and the second side wall. A first generator is mounted between the first sidewall of the housing and the electric motor. The first generator includes a second stator and a second rotor concentric to the second stator. A second shaft is coupled to a central portion of the second rotor. A third fan drives the second rotor and the second shaft of the first generator to rotate. The first fan and the third fan are located opposite to and adjacent to each other. A second generator is mounted between the second side wall of the housing and the electric motor. The second generator includes a third stator and a third rotor concentric to the third stator. A third shaft is coupled to a central portion of the third rotor. A fourth fan drives the third rotor and the third shaft of the second generator to rotate. The second fan and the fourth fan are located opposite to each other. A power device is mounted in the housing. The power device includes a chargeable battery connected to a start switch. The chargeable battery is connected to the first generator and the second generator. The start switch is connected to the electric motor.

When the chargeable battery supplies electricity to the electric motor, the first shaft of the electric motor drives the first fan and the second fan to rotate to thereby generate wind power in the housing close to the third fan. The third fan is driven by the wind power to drive the second rotor of the first generator to rotate. The first generator generates electricity that is supplied to the chargeable battery. The second fan uses the wind power in the housing to drive the fourth fan to rotate. The fourth fan drives the third rotor of the second generator to rotate, and the second generator generates electricity that is supplied to the chargeable battery.

In an example, the housing further includes a first support mounted between the first sidewall and the second sidewall. The electric motor includes a motor casing fixed to the first support. The first end of the first shaft faces the third fan and is securely coupled to the first fan. The first generator is fixed to the first sidewall. The third fan is securely coupled to the second shaft. The second generator is fixed to the second sidewall. The fourth fan is securely coupled to the third shaft.

In an example, the first end and the second end of the first shaft of the electric motor extend beyond the motor casing. The second end of the first shaft extends toward the fourth fan and is securely coupled to the second fan.

In an example, the first end and the second end of the first shaft of the electric motor extend beyond the motor casing. The second end of the first shaft extends toward the fourth fan and is securely coupled to a transmission wheel. An axle is fixed to the first support. The second fan is rotatably mounted to the axle. A driven wheel is mounted around the axle and is coupled with the transmission wheel. The transmission wheel drives the driven wheel and the second fan to rotate.

In an example, the first fan and the second fan are securely coupled to the first end of the first shaft of the electric motor and are spaced from each other.

In an example, the housing further includes a first support mounted between the first sidewall and the second sidewall. A second support is mounted between the first sidewall and the first support. The electric motor includes a motor casing fixed to the first support. The first end and the second end of the first shaft extend beyond the motor casing. The first generator is fixed to the second support. The third fan is securely coupled to the second shaft. The fourth fan is securely coupled to the third shaft of the second generator. The first end of the first shaft of the electric motor extends beyond the second shaft of the first generator and the central portion of the third fan to securely couple with the first fan. The second end of the first shaft is securely coupled to the second fan.

In an example, the second generator is securely coupled to a bottom side of the first support. The second end of the first shaft of the electric motor extends beyond the third shaft of the second generator and the central portion of the fourth fan to securely couple with the second fan.

In an example, the generator is fixed to the peripheral wall of the housing. The first generator is fixed to the first sidewall. The third fan is securely coupled to the second shaft. The second generator is fixed to the second sidewall. The fourth fan is securely coupled to the third shaft. A transmission unit is mounted between the first generator and the second generator. The transmission unit includes a shaft seat having an end fixed to the peripheral wall. A transmission shaft is rotatably supported in the shaft seat. A first pulley is fixed to the first shaft. A second pulley is fixed to the transmission shaft. A belt is mounted around the first pulley and the second pulley. The first fan is securely coupled to an end of the transmission shaft and faces the third fan. The second fan is securely coupled to the other end of the transmission shaft and faces the fourth fan.

In an example, the third fan has a diameter larger than a diameter of the first fan, and the fourth fan has a diameter larger than a diameter of the second fan.

In an example, the power device further includes a charging controller serially connected between the chargeable battery, the first generator, and the second generator. The chargeable battery is electrically connected to a voltage boost controller for outputting electricity.

The present invention will become clearer in light of the following detailed description of illustrative embodiments of this invention described in connection with the drawings.

DETAILED DESCRIPTION OF THE INVENTION

Figure 1:
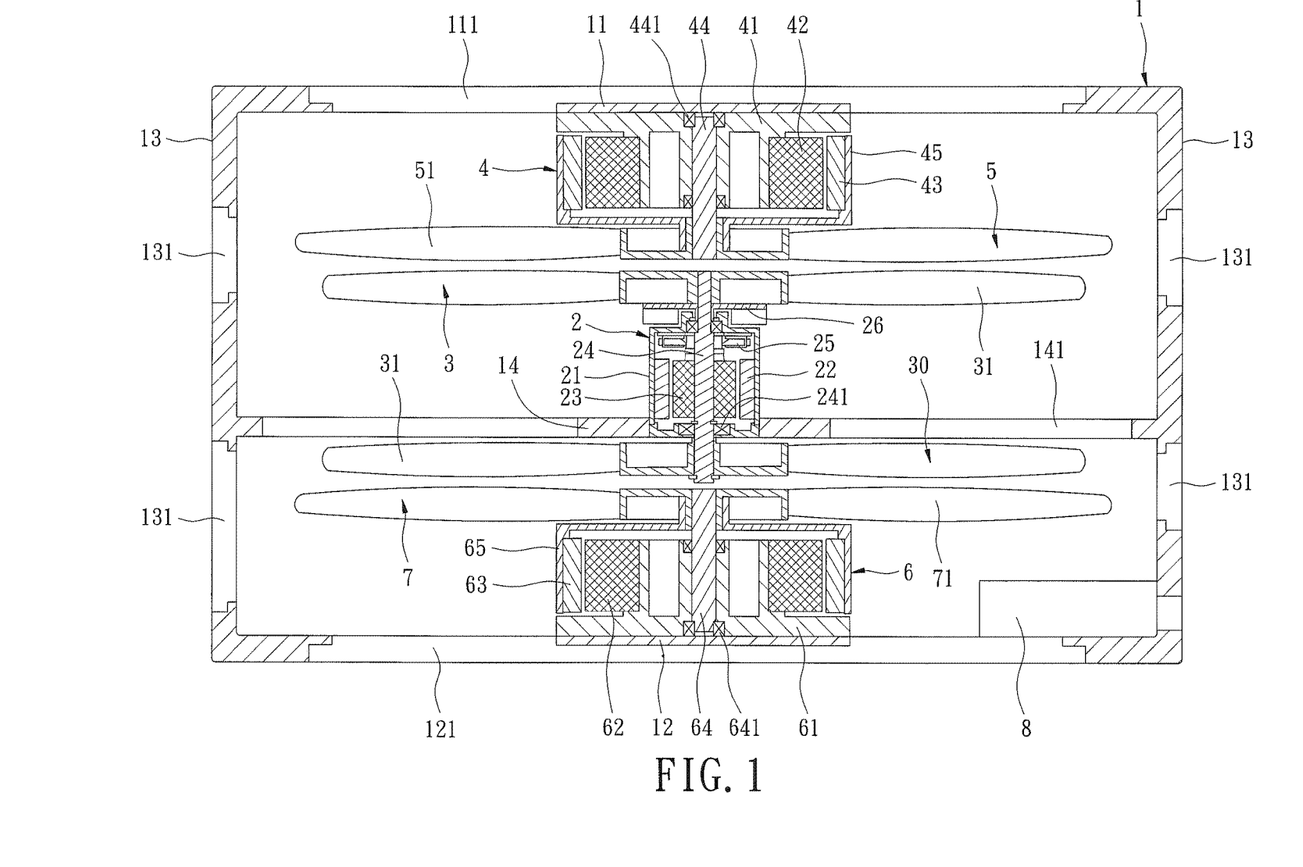
FIG. 1 is a diagrammatic cross sectional view of an electric fan-type power generating device with low energy consumption of a first example according to the present invention.
Figure 2:
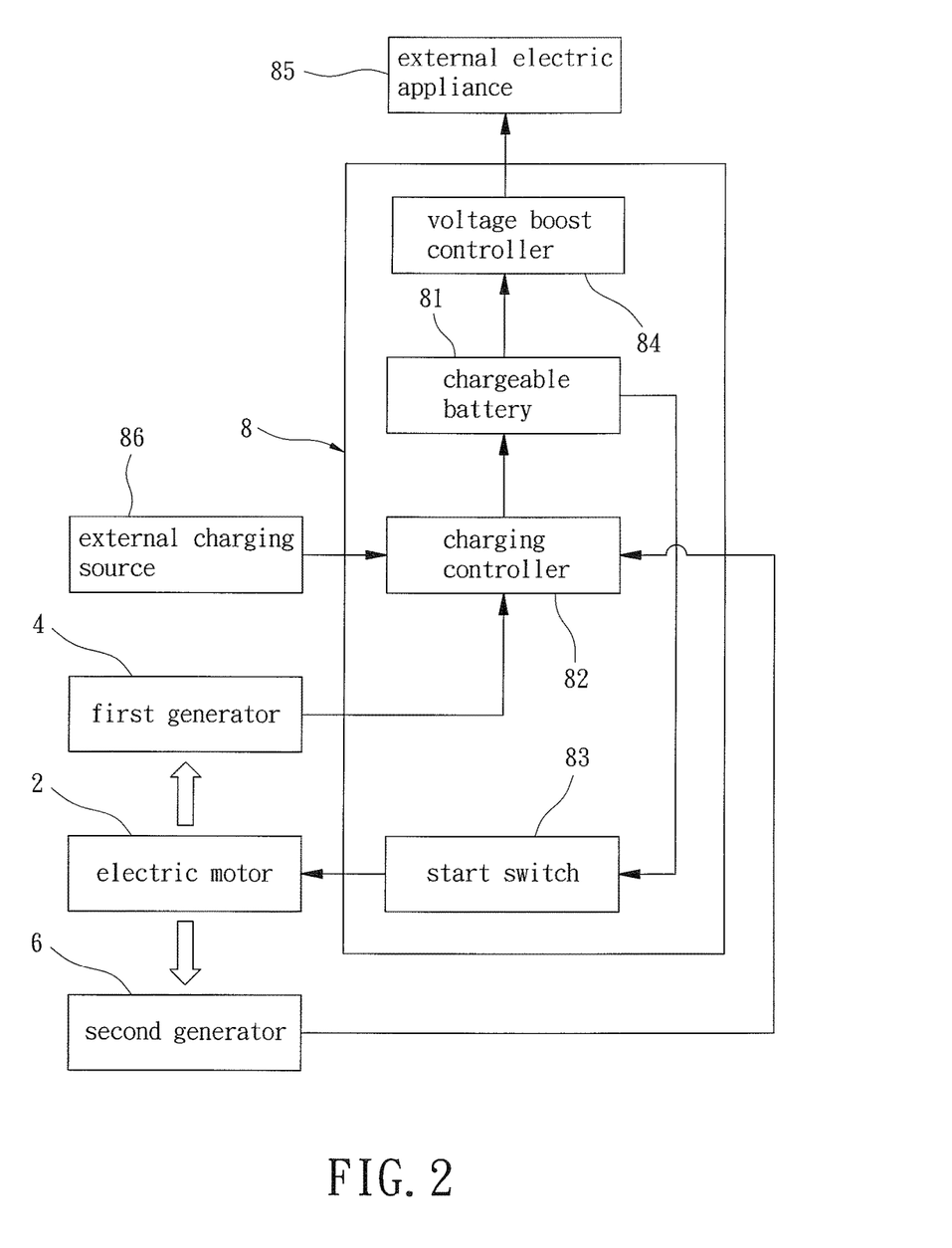
FIG. 2 is a block diagram of the electric fan-type power generating device of FIG. 1.
Figure 3:
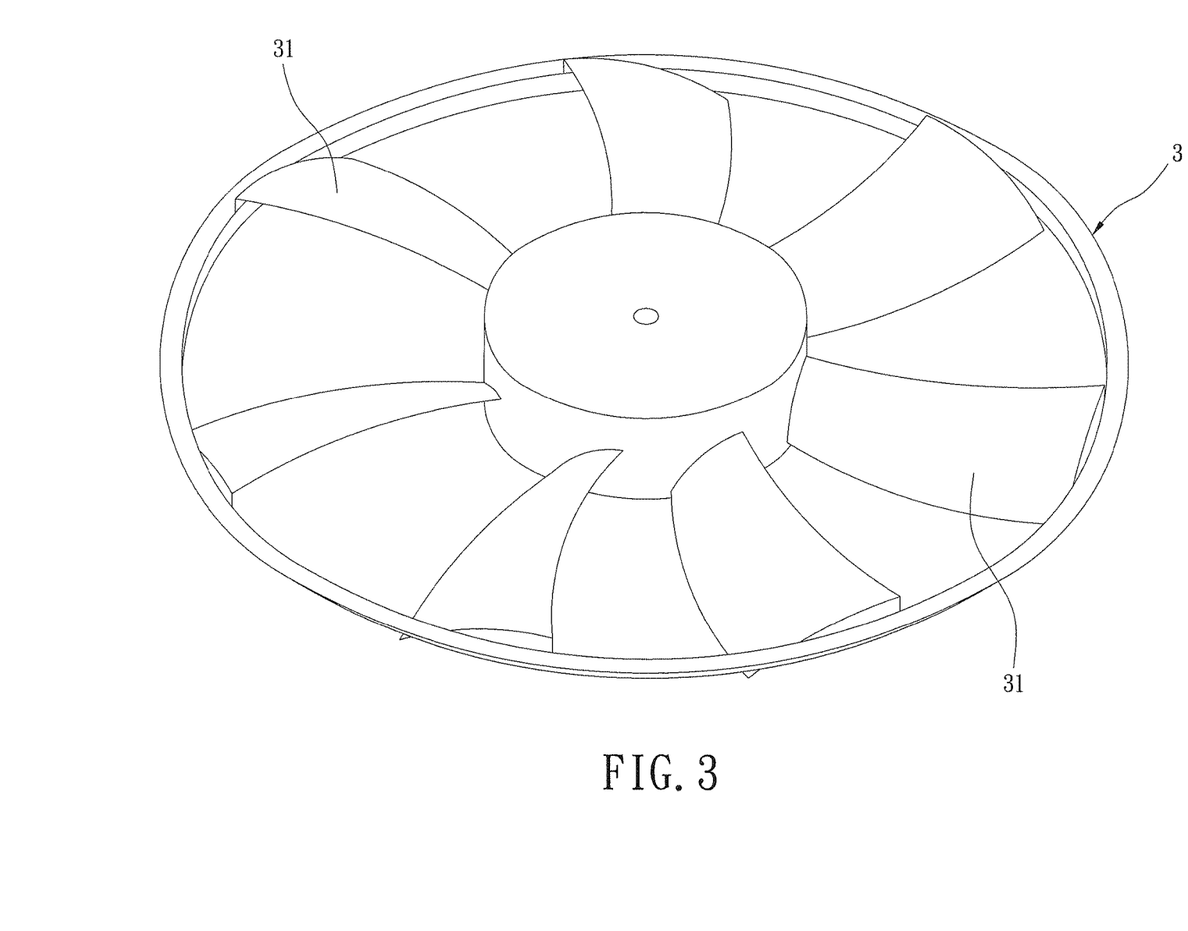
FIG. 3 is a perspective view of a first fan of the electric fan-type power generating device of FIG. 1.

With reference to FIGS. 1-3, an electric fan-type power generating device with low energy consumption of a first example according to the present invention includes a housing 1 having a first sidewall 11, a second sidewall 12 opposite to the first sidewall 11, and a peripheral wall 13 interconnected between the first sidewall 11 and the second sidewall 12. The housing 1 further includes a first support 14 extending parallel to and located between the first sidewall 11 and the second sidewall 12. Vents 111, 121, 131, and 141 are respectively defined in the first sidewall 11, the second sidewall 12, the peripheral wall 13, and the first support 14.

An electric motor 2 is mounted in the housing 1 and includes a first stator 22 and a first rotor 23 concentric to the first stator 22. The electric motor 2 further includes an electrically connected carbon brush 25. A first shaft 24 extends through a central portion of the first rotor 23 and is coupled to the first rotor 23. The electric motor 2 further includes a motor casing 21 fixed to a side of the first support 14 facing the first sidewall 11. A first end and a second end of the first shaft 24 respectively extend through two bearings 241, extend beyond the casing 21, and face the first sidewall 11 and the second sidewall 12, respectively. A heat dissipating fan 26 is securely coupled to the first shaft 24.

Each of a first fan 3 and a second fan 30 includes a plurality of fan blades 31 on an outer periphery thereof. A central portion of the first fan 3 and a central portion of the second fan 30 are respectively fixed to the first end and the second end of the first shaft 24 of the electric motor 2. Thus, the first fan 3 and the second fan 30 can be driven by the first rotor 23 and the first shaft 24 of the electric motor 2. The first fan 3 is located between the first sidewall 1 and the first support 14. The second fan 30 is located between the second sidewall 12 and the second support 15.

A first generator 4 includes a second stator 42 and a second rotor 43 concentric to the second stator 42. The first generator 4 further includes a base 41 fixed to the first sidewall 11 of the housing 1 and located in the housing 1. A second shaft 44 is rotatably mounted to a central portion of the base 41, extends beyond the first generator 4, and is supported by at least one bearing 441. The second rotor 43 is mounted around and spaced from the second stator 42. Furthermore, a rotor seat 45 is fixed around the second rotor 43.

A third fan 5 includes a plurality of fan blades 51 mounted on an outer periphery thereof. A central portion of the third fan 5 is fixed to the second shaft 44 and a side of the rotor seat 45 to drive the second rotor 43 of the first generator 4 to rotate. The third fan 5 faces the first fan 3. Thus, the first fan 3 and the third fan 5 are located opposite to and adjacent to each other.

A second generator 6 includes a third stator 62 and a third rotor 63 concentric to the third stator 62. The second generator 6 includes a base 61 fixed to the second sidewall 12 and located in the housing 1. A third shaft 64 is rotatably mounted to a central portion of the base 61, extends beyond the second generator 6, and is supported by at least one bearing 641. The third rotor 63 is mounted around and spaced from the third stator 62. Furthermore, a rotor seat 65 is fixed around the third rotor 63.

A fourth fan 7 includes a plurality of blades 71 on an outer periphery thereof. A central portion of the fourth fan 7 is fixed to the third shaft 64 and a side of the rotor seat 65 to drive the third rotor 63 of the second generator 6 to rotate.

The fourth fan 7 faces the second fan 30. Thus, the second fan 30 and the fourth fan 7 are located opposite to and adjacent to each other.

A power device 8 is mounted in the housing 1 and includes a chargeable battery 81 connected to a start switch 83. The chargeable battery 81 is connected to the first generator 4 and the second generator 6. The start switch 83 is connected to the electric motor 2. Furthermore, the power device 8 further includes a charging controller 82 serially connected between the chargeable battery 81, the first generator 4, and the second generator 6. The chargeable battery 81 is electrically connected to a voltage boost controller 84 for outputting electricity to an external electric appliance 85 (such as a mobile phone, a tablet computer, a personal digital assistant, etc.) according to need. Furthermore, the charging controller 82 is selectively connected to an external charging source 86 or main power to charge the chargeable battery 81.

When the chargeable battery 81 of the power device 8 supplies electricity through the start switch 83 to the electric motor 2, the first shaft 24 of the electric motor 2 drives the first fan 3 and the second fan 30 to rotate at high speeds to thereby generate wind power close to the third fan 5. The third fan 5 is driven by the wind power in the housing 1 to drive the second rotor 43 of the first generator 4 to rotate, and the first generator 4 generates electricity that is supplied to the chargeable battery 81. Thus, the chargeable battery 81 recycles the electricity. At the same time, the second fan 30 uses the wind power in the housing 1 to drive the fourth fan 7 to rotate. The fourth fan 7 drives the third rotor 63 of the second generator 6 to rotate, and the second generator 6 generates electricity that is supplied to the chargeable battery 81. The chargeable battery 81 recycles the electricity that supports operation of the electric motor 2 for generating wind power. Furthermore, the wind power drives the first generator 4 and the second generator 6 to continue generating electricity. Furthermore, the diameters of the third fan 5 and the fourth fan 7 are respectively larger than the diameters of the first fan 3 and the second fan 30 to increase the windage area and the starting speed. Accordingly, the present invention can be directly used anytime and anywhere while prolonging the service time of the chargeable battery 81. Furthermore, the power device 8 and the chargeable battery 81 can provide an optional output power source to the external electric appliance 85 via the voltage boost controller 84 according to need.

Figure 4:
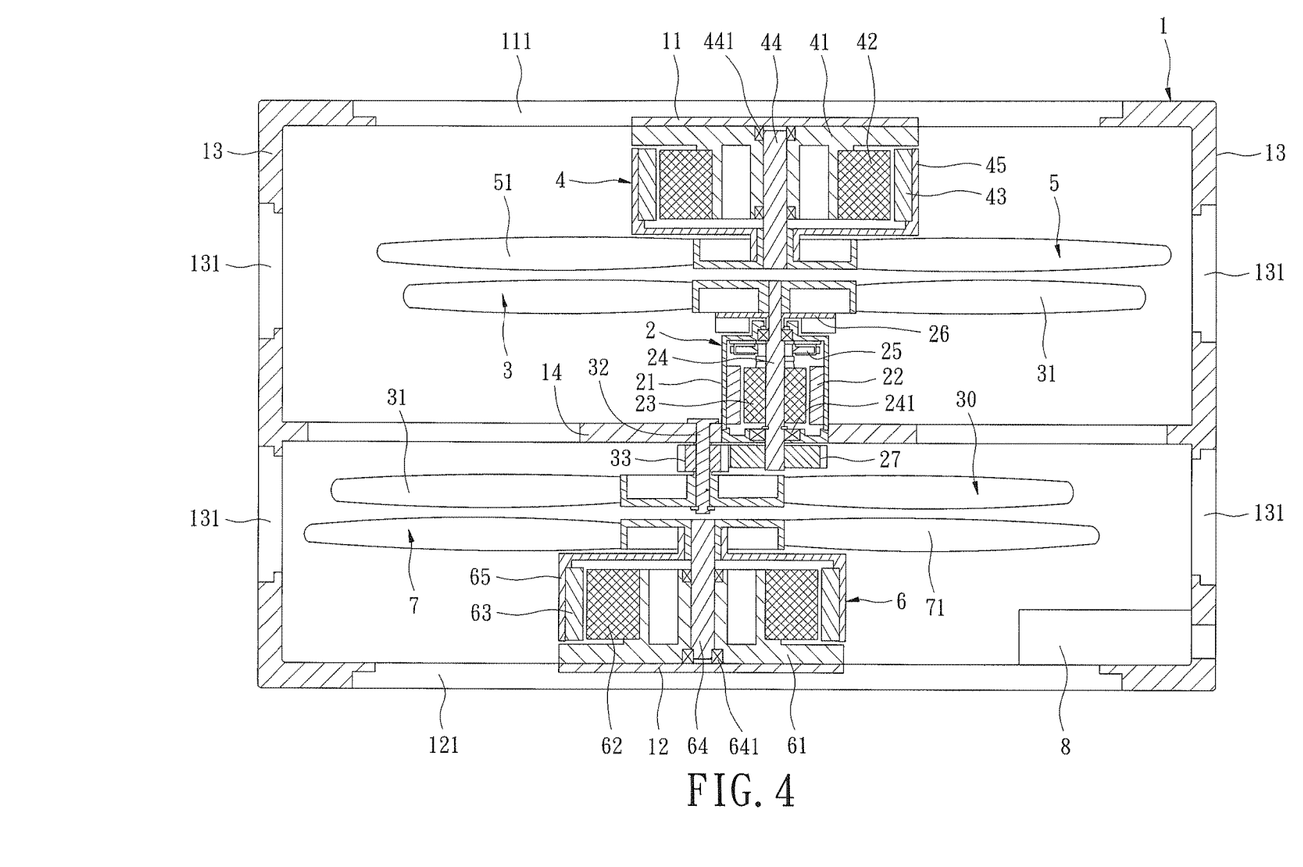
FIG. 4 is a diagrammatic cross sectional view of an electric fan-type power generating device with low energy consumption of a second example according to the present invention.

FIG. 4 shows a second embodiment similar to the first embodiment, wherein like reference numerals are used to designate like elements. The second embodiment is different from the first embodiment by that the second end of the first shaft 24 is securely coupled to a transmission wheel 27, and an axle 32 is fixed to the first support 14. The second fan 30 is rotatably mounted to the axle 32. A driven wheel 33 is mounted around the axle 32 and is coupled with the transmission wheel 27, such as by gear meshing. The transmission wheel 27 drives the driven wheel 33 and the second fan 30 to proceed with acceleration of rotation for increasing the wind power. In an alternative example, the transmission wheel 27 drives the second fan 30 for deceleration of rotation for the purposes of increasing the torque.

Figure 5:
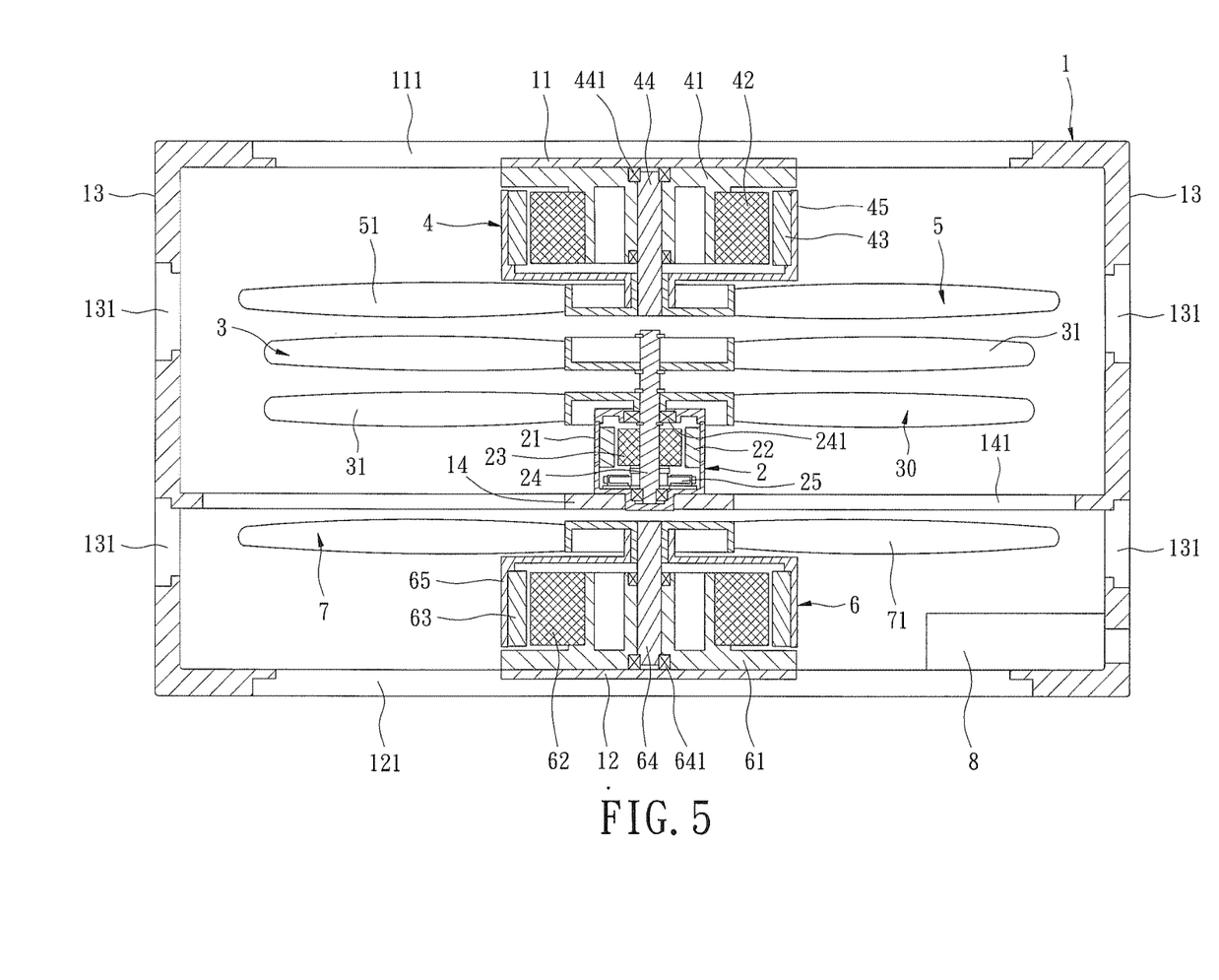
FIG. 5 is a diagrammatic cross sectional view of an electric fan-type power generating device with low energy consumption of a third example according to the present invention.

FIG. 5 shows a third embodiment similar to the first embodiment, wherein like reference numerals are used to designate like elements. The third embodiment is different from the first embodiment by that the first end of the first shaft 24 of the electric motor 2 extends beyond the motor casing 21 and faces the third fan 5. Furthermore, the first fan 3 and the second fan 30 are securely coupled to the first end of the first shaft 24 of the electric motor 2 and are spaced from each other. The second face 30 faces the second fan 7.

Figure 6:
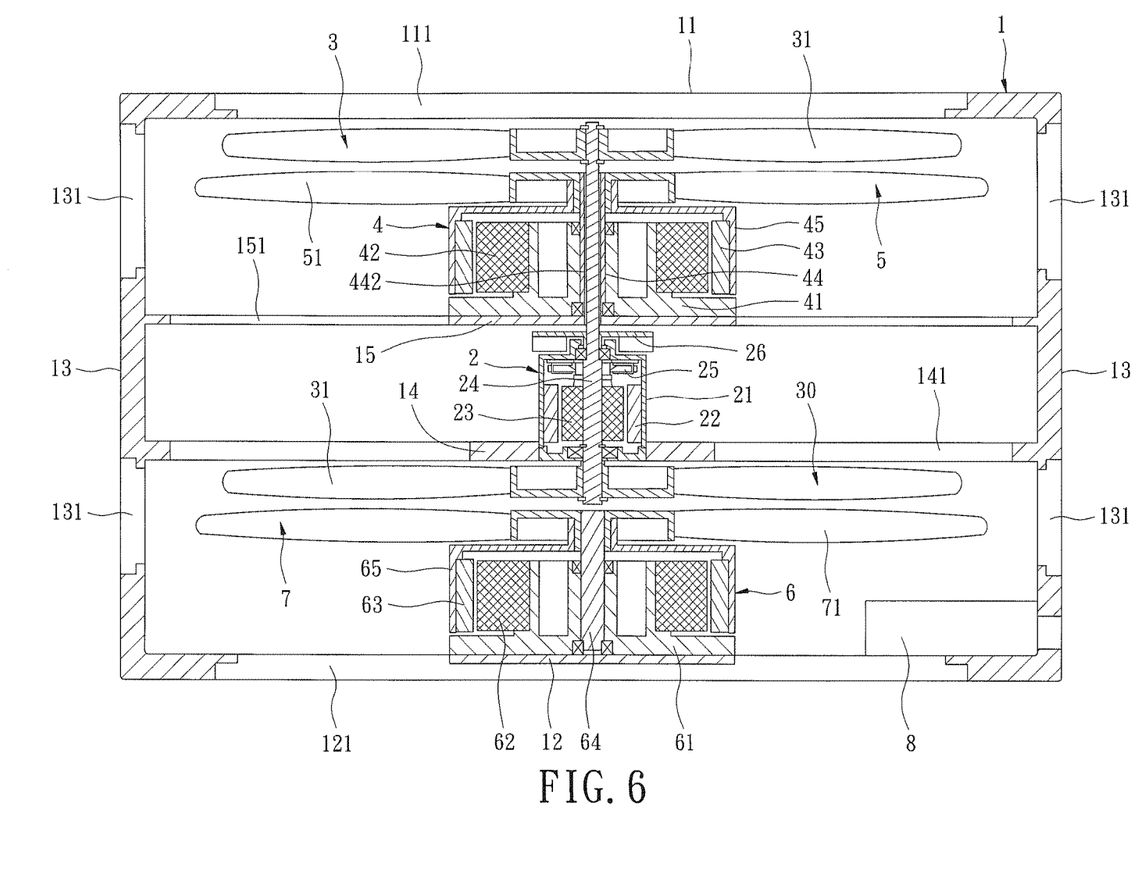
FIG. 6 is a diagrammatic cross sectional view of an electric fan-type power generating device with low energy consumption of a fourth example according to the present invention.

FIG. 6 shows a fourth embodiment similar to the first embodiment, wherein like reference numerals are used to designate like elements. The fourth embodiment is different from the first embodiment by that a second support 15 is mounted between the first sidewall 11 and the first support 14, and the first generator 4 is fixed to the second support 15. The first end of the first shaft 24 of the electric motor 2 extends beyond an axial hole 442 of the second shaft 44 of the first generator 4 and the central portion of the third fan 5 to securely couple with the first fan 3. Thus, the first fan 3 faces the third fan 5. Note that the first shaft 24 is spaced from inner peripheries of the axial hole 442 of the second shaft 44 of the first generator 4 and the central portion of the third fan 5.

Figure 7:
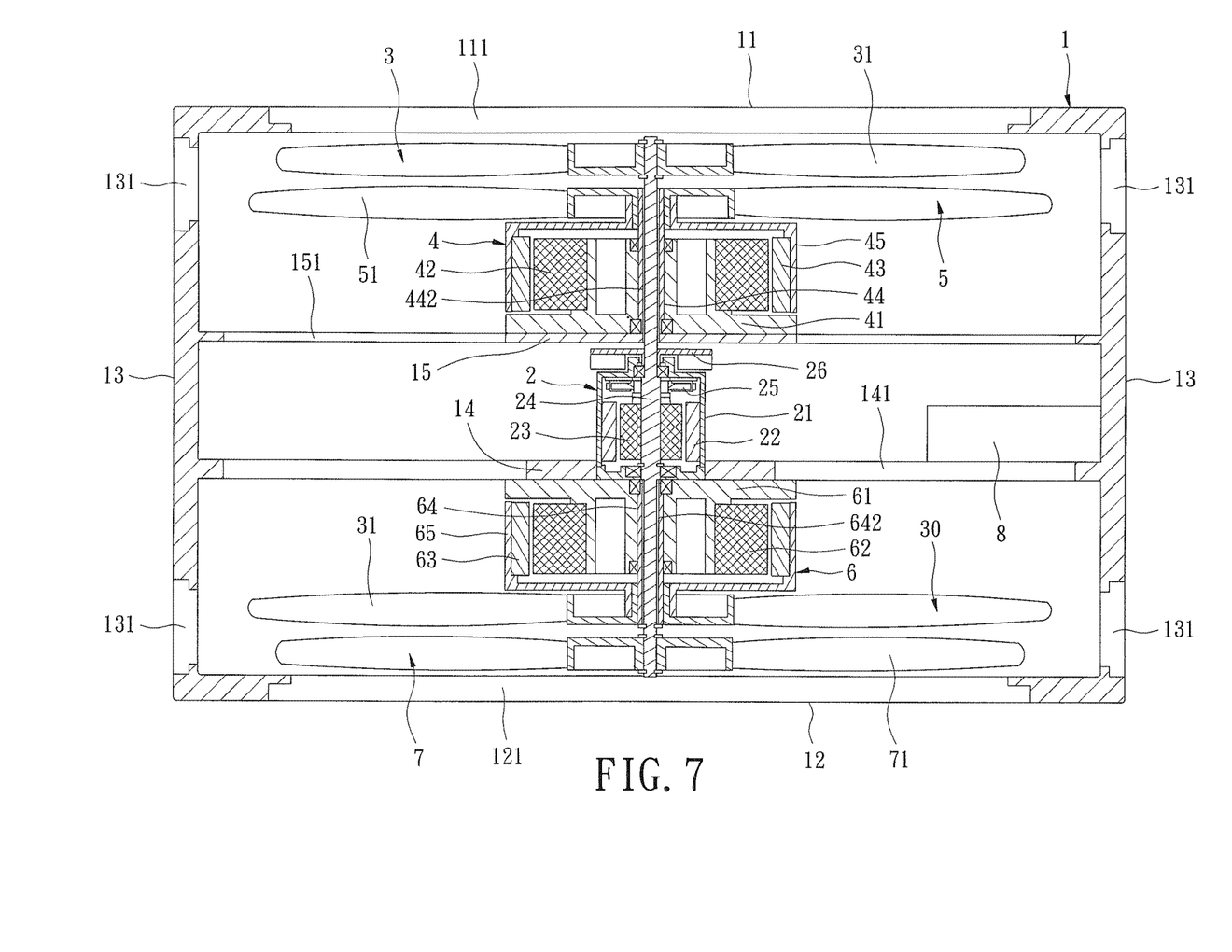
FIG. 7 is a diagrammatic cross sectional view of an electric fan-type power generating device with low energy consumption of a fifth example according to the present invention.

FIG. 7 shows a fifth embodiment similar to the fourth embodiment, wherein like reference numerals are used to designate like elements. The fifth embodiment is different from the fourth embodiment by that the second generator 6 is securely coupled to a bottom side of the first support 14. Furthermore, the second end of the first shaft 24 of the electric motor 2 extends beyond an axial hole 642 of the third shaft 64 of the second generator 6 and the central portion of the fourth fan 7 to securely couple with the second fan 30. Thus, the second fan 30 faces the fourth fan 7. Note that the first shaft 24 is spaced from inner peripheries of the axial hole 642 of the third shaft 64 of the second generator 6 and the central portion of the fourth fan 7.

Figure 8:
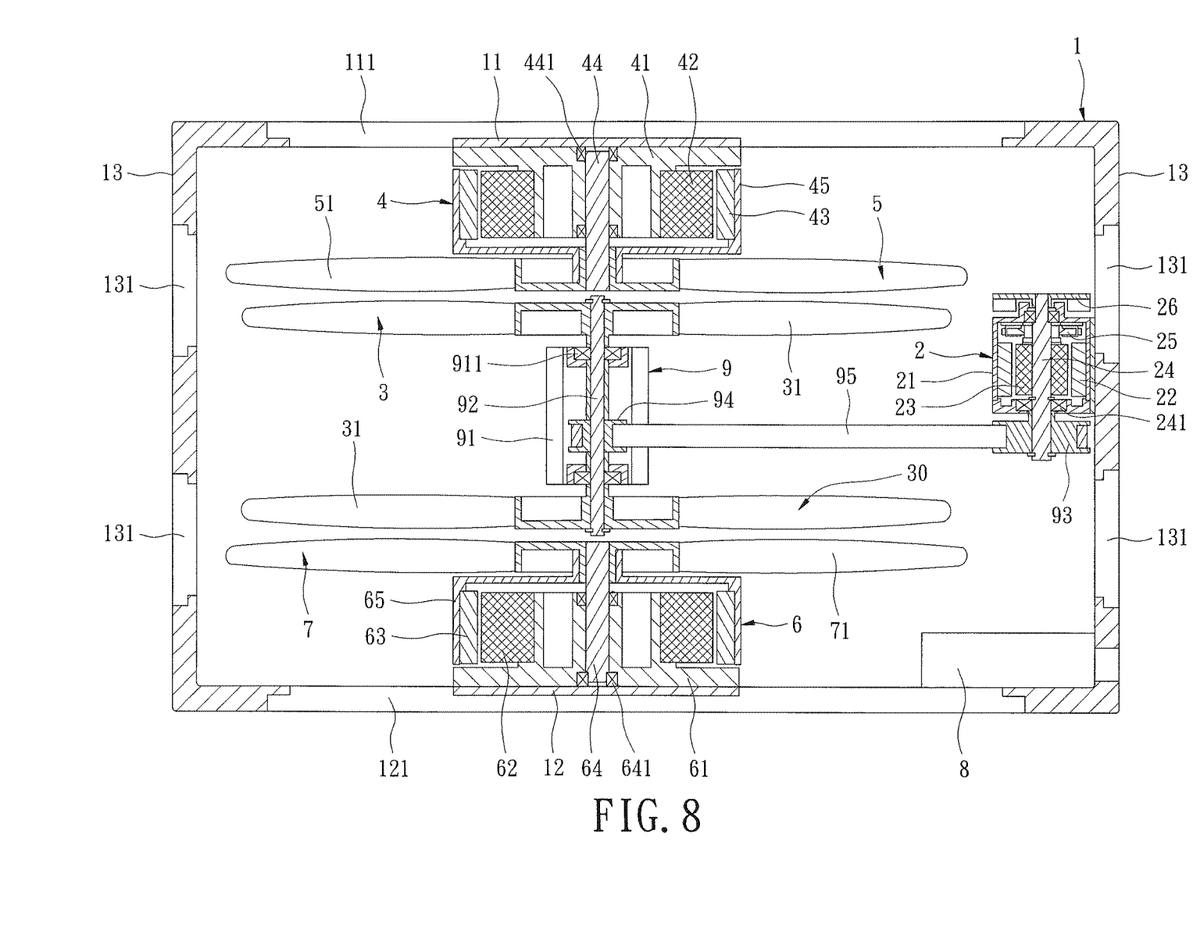
FIG. 8 is a diagrammatic cross sectional view of an electric fan-type power generating device with low energy consumption of a sixth example according to the present invention.

FIG. 8 shows a sixth embodiment similar to the first embodiment, wherein like reference numerals are used to designate like elements. The sixth embodiment is different from the first embodiment by that the generator 2 is fixed to an inner face of the peripheral wall 13 of the housing 1, and a transmission unit 9 is mounted between the first generator 4 and the second generator 6. The transmission unit 9 includes a shaft seat 91 having an end fixed to the peripheral wall 13. A transmission shaft 92 is rotatably received in the shaft seat 91 and supported by two bearings 911. A first pulley 93 is fixed to an end of the first shaft 24. A second pulley 94 is fixed to the transmission shaft 92. A belt 95 is mounted around the first pulley 93 and the second pulley 94. The first fan 3 is securely coupled to an end of the transmission shaft 92 and faces the third fan 5. The second fan 30 is securely coupled to the other end of the transmission shaft 92 and faces the fourth fan 7.

When the electric motor 2 is activated, the first shaft 24 of the electric motor 2 drives the transmission shaft 92, the first fan 3, and the second fan 30 to rotate at high speeds to thereby generate wind power close to the third fan 5 and the fourth fan 7. The third fan 5 and the fourth fan 7 are driven by the wind power to drive the first generator 4 and the second generator 6 to thereby generate electricity that can be outputted.

Although specific embodiments have been illustrated and described, numerous modifications and variations are still possible without departing from the scope of the invention. The scope of the invention is limited by the accompanying claims.

The invention claimed is:

1. An electric fan-type power generating device with low energy consumption, comprising:
a housing including a first sidewall, a second sidewall opposite to the first sidewall, and a peripheral wall interconnected between the first sidewall and the second sidewall, wherein the housing includes a plurality of vents;

an electric motor mounted in the housing, wherein the electric motor includes a first stator and a first rotor concentric to the first stator, wherein a first shaft extends through a central portion of the first rotor and is coupled to the first rotor, and wherein the first shaft includes a first end facing the first sidewall and a second end facing the second sidewall;

a first fan and a second fan opposite to the first fan, wherein the first fan and the second fan are driven by the first shaft of the electric motor, and wherein the second fan is located between the first fan and the second side wall;

a first generator mounted between the first sidewall of the housing and the electric motor, wherein the first generator includes a second stator and a second rotor concentric to the second stator, and wherein a second shaft is coupled to a central portion of the second rotor;

a third fan driving the second rotor and the second shaft of the first generator to rotate, wherein the first fan and the third fan are located opposite to and adjacent to each other;

a second generator mounted between the second side wall of the housing and the electric motor, wherein the second generator includes a third stator and a third rotor concentric to the third stator, and wherein a third shaft is coupled to a central portion of the third rotor;

a fourth fan driving the third rotor and the third shaft of the second generator to rotate, wherein the second fan and the fourth fan are located opposite to each other; and a power device mounted in the housing, wherein the power device includes a chargeable battery connected to a start switch, wherein the chargeable battery is connected to the first generator and the second generator, and wherein the start switch is connected to the electric motor, wherein when the chargeable battery supplies electricity to the electric motor, the first shaft of the electric motor drives the first fan and the second fan to rotate to thereby generate wind power in the housing close to the third fan, wherein the third fan is driven by the wind power to drive the second rotor of the first generator to rotate, and the first generator generates electricity that is supplied to the chargeable battery, wherein the second fan uses the wind power in the housing to drive the fourth fan to rotate, wherein the fourth fan drives the third rotor of the second generator to rotate, and the second generator generates electricity that is supplied to the chargeable battery.

2. The electric fan-type power generating device with low energy consumption as claimed in claim 1, wherein the housing further includes a first support mounted between the first sidewall and the second sidewall, wherein the electric motor includes a motor casing fixed to the first support, wherein the first end of the first shaft faces the third fan and is securely coupled to the first fan, wherein the first generator is fixed to the first sidewall, wherein the third fan is securely coupled to the second shaft, wherein the second generator is fixed to the second sidewall, and wherein the fourth fan is securely coupled to the third shaft.

3. The electric fan-type power generating device with low energy consumption as claimed in claim 2, wherein the first end and the second end of the first shaft of the electric motor extend beyond the motor casing, and wherein the second end of the first shaft extends toward the fourth fan and is securely coupled to the second fan.

4. The electric fan-type power generating device with low energy consumption as claimed in claim 2, wherein the first end and the second end of the first shaft of the electric motor extend beyond the motor casing, wherein the second end of the first shaft extends toward the fourth fan and is securely coupled to a transmission wheel, wherein an axle is fixed to the first support, wherein the second fan is rotatably mounted to the axle, wherein a driven wheel is mounted around the axle and is coupled with the transmission wheel, and wherein the transmission wheel drives the driven wheel and the second fan to rotate.

5. The electric fan-type power generating device with low energy consumption as claimed in claim 2, wherein the first fan and the second fan are securely coupled to the first end of the first shaft of the electric motor and are spaced from each other.

6. The electric fan-type power generating device with low energy consumption as claimed in claim 1, wherein the housing further includes a first support mounted between the first sidewall and the second sidewall, wherein a second support is mounted between the first sidewall and the first support, wherein the electric motor includes a motor casing fixed to the first support, wherein the first end and the second end of the first shaft extend beyond the motor casing, wherein the first generator is fixed to the second support, wherein the third fan is securely coupled to the second shaft, wherein the fourth fan is securely coupled to the third shaft of the second generator, wherein the first end of the first shaft of the electric motor extends beyond the second shaft of the first generator and the central portion of the third fan to securely couple with the first fan, and wherein the second end of the first shaft is securely coupled to the second fan.

7. The electric fan-type power generating device with low energy consumption as claimed in claim 6, wherein the second generator is securely coupled to a bottom side of the first support, and wherein the second end of the first shaft of the electric motor extends beyond the third shaft of the second generator and the central portion of the fourth fan to securely couple with the second fan.

8. The electric fan-type power generating device with low energy consumption as claimed in claim 1, wherein the generator is fixed to the peripheral wall of the housing, wherein the first generator is fixed to the first sidewall, wherein the third fan is securely coupled to the second shaft, wherein the second generator is fixed to the second sidewall, wherein the fourth fan is securely coupled to the third shaft, wherein a transmission unit is mounted between the first generator and the second generator, wherein the transmission unit includes a shaft seat having an end fixed to the peripheral wall, a transmission shaft rotatably supported in the shaft seat, a first pulley fixed to the first shaft, a second pulley fixed to the transmission shaft, and a belt mounted around the first pulley and the second pulley, wherein the first fan is securely coupled to an end of the transmission shaft and faces the third fan, and wherein the second fan is securely coupled to another end of the transmission shaft and faces the fourth fan.

9. The electric fan-type power generating device with low energy consumption as claimed in claim 1, wherein the third fan has a diameter larger than a diameter of the first fan, and wherein the fourth fan has a diameter larger than a diameter of the second fan.

10. The electric fan-type power generating device with low energy consumption as claimed in claim 1, wherein the power device further includes a charging controller serially connected between the chargeable battery, the first generator, and the second generator, and wherein the chargeable battery is electrically connected to a voltage boost controller for outputting electricity.

\* \* \* \* \*